US012422538B2

(12) United States Patent
Arkind

(10) Patent No.: US 12,422,538 B2
(45) Date of Patent: Sep. 23, 2025

(54) EFFICIENT DIRECTION OF ARRIVAL ESTIMATION USING LOW RANK APPROXIMATION

(71) Applicant: Arbe Robotics Ltd., Tel Aviv (IL)

(72) Inventor: Noam Arkind, Givatayim (IL)

(73) Assignee: Arbe Robotics Ltd. (IL)

( * ) Notice: Subject to any disclaimer, the term of this patent is extended or adjusted under 35 U.S.C. 154(b) by 330 days.

(21) Appl. No.: 18/030,277

(22) PCT Filed: Nov. 9, 2021

(86) PCT No.: PCT/IL2021/051332
§ 371 (c)(1),
(2) Date: Apr. 5, 2023

(87) PCT Pub. No.: WO2022/097158
PCT Pub. Date: May 12, 2022

(65) Prior Publication Data
US 2023/0375690 A1     Nov. 23, 2023

(30) Foreign Application Priority Data
Nov. 9, 2020    (IL) .......................................... 278587

(51) Int. Cl.
*G01S 13/42*     (2006.01)
*G01S 7/35*     (2006.01)
*G01S 13/931*     (2020.01)

(52) U.S. Cl.
CPC .............. *G01S 13/42* (2013.01); *G01S 7/356* (2021.05); *G01S 13/931* (2013.01)

(58) Field of Classification Search
CPC ........ G01S 13/42; G01S 7/356; G01S 13/931; G01S 13/584; G01S 13/343; G01S 13/89; G01S 7/0232
See application file for complete search history.

(56) References Cited

U.S. PATENT DOCUMENTS 3,603,989 A    9/1971   Caspers
3,981,012 A    9/1976   Brault
(Continued)

FOREIGN PATENT DOCUMENTS

CN      1967286 A    5/2007
CN    101128988 A    2/2008
(Continued)

OTHER PUBLICATIONS

Jason Yu et al: "Multiband chirp synthesis for frequency-hopped FMCW radar", Signals, Systems and Computers, 2009 Conference Record of the Forty-Third Asilomar Conference on, IEEE, Piscataway, NJ, USA, Nov. 1, 2009 (Nov. 1, 2009), pp. 1315-1319, XP031679466, ISBN: 978-1-4244-5825-7.
(Continued)

*Primary Examiner* — Ladimir Magloire
*Assistant Examiner* — Naomi M Wolford
(74) *Attorney, Agent, or Firm* — Zaretsky Group PC; Howard Zaretsky

(57) ABSTRACT

A novel and useful system and method for direction of arrival (DOA) estimation having a complexity of order O(N log N), which allows a DOA dependent calibration. In one embodiment, the architecture comprises several fast Fourier transform (FFT) machines operating in parallel with coefficient multiplications before and after the FFT operations. These pre and post coefficients are computed using an optimal low rank approximation of a distortion matrix using singular value decomposition. The values of the pre and post calibration coefficients before and after the FFT operations for each rank are computed from the singular value decomposition of the distortion matrix C=B/F, where B is the digital beam forming (DBF) matrix and F is the ideal FFT matrix. A method of acquiring the beamforming matrix B is also disclosed. The architecture implements $K \times N \times \log_2 N$
(Continued)

operations which for relatively low rank is significantly smaller than the $N^2$ operations required for the complete matrix multiplication, where K is the rank of the approximation of the FFT. A circuit and method for computing the calibration coefficients and a simple proof that this approximates a general beam forming matrix is disclosed.

19 Claims, 6 Drawing Sheets

(56) References Cited

U.S. PATENT DOCUMENTS

| | | |
|---|---|---|
| 4,166,980 A | 9/1979 | Apostolos |
| 4,197,540 A | 4/1980 | Riggs |
| 4,490,720 A | 12/1984 | Kuntman |
| 4,494,083 A | 1/1985 | Josefsson |
| 4,926,185 A | 5/1990 | Wittenberg |
| 5,063,603 A | 11/1991 | Burt |
| 5,424,742 A | 6/1995 | Long |
| 5,430,445 A | 7/1995 | Peregrim |
| 5,442,362 A | 8/1995 | Zwarts |
| 5,694,130 A | 12/1997 | Suzuki |
| 5,923,280 A | 7/1999 | Farmer |
| 5,955,992 A | 9/1999 | Shattil |
| 6,028,548 A | 2/2000 | Farmer |
| 6,104,673 A | 8/2000 | Cole |
| 6,172,939 B1 | 1/2001 | Cole |
| 6,204,803 B1 | 3/2001 | Uehara |
| 6,363,033 B1 | 3/2002 | Cole |
| 6,614,384 B2 | 9/2003 | Hall |
| 6,822,604 B2 | 11/2004 | Hall |
| 6,828,929 B2 | 12/2004 | Barbella |
| 6,865,216 B1 | 3/2005 | Beamish |
| 6,888,887 B1 | 5/2005 | Shattil |
| 6,989,782 B2 | 1/2006 | Walker |
| 7,071,868 B2 | 7/2006 | Woodington |
| 7,119,733 B2 | 10/2006 | Schoeberl |
| 7,129,886 B2 | 10/2006 | Hall |
| 7,148,840 B2 | 12/2006 | Dooi |
| 7,308,043 B1 | 12/2007 | Frank |
| 7,372,394 B1 | 5/2008 | Woodell |
| 7,528,765 B1 | 5/2009 | Woodell |
| 7,541,968 B2 | 6/2009 | Hall |
| 7,639,171 B2 | 12/2009 | Alland |
| 7,804,445 B1 | 9/2010 | Fiore |
| 7,835,455 B2 | 11/2010 | Shattil |
| 7,859,450 B2 | 12/2010 | Shirakawa |
| 7,903,038 B2 | 3/2011 | Tietjen |
| 8,035,038 B2 | 10/2011 | Cheng |
| 8,175,134 B1 | 5/2012 | Giallorenzi |
| 8,184,040 B2 | 5/2012 | Takase |
| 8,599,062 B2 | 12/2013 | Szajnowski |
| 8,762,139 B2 | 6/2014 | Furuta |
| 8,803,732 B2 | 8/2014 | Antonik |
| 8,970,425 B2 | 3/2015 | Nogueira-Nine |
| 8,976,061 B2 | 3/2015 | Chowdhury |
| 9,250,322 B2 | 2/2016 | Newman |
| 9,261,590 B1 | 2/2016 | Brown |
| 9,341,705 B2 | 5/2016 | Yannone |
| 9,557,585 B1 | 1/2017 | Yap |
| 9,645,228 B1 | 5/2017 | Doerry |
| 9,791,564 B1 | 10/2017 | Harris |
| 9,880,275 B2 | 1/2018 | Jeong |
| 10,078,129 B2 | 9/2018 | Sugino |
| 10,082,570 B1 | 9/2018 | Izadian |
| 10,094,920 B2 | 10/2018 | Rao |
| 10,168,419 B2 | 1/2019 | Trummer |
| 10,359,504 B2 | 7/2019 | Fetterman |
| 10,451,723 B2 | 10/2019 | Chiu |
| 11,199,617 B2 | 12/2021 | Hakobyan |
| 11,277,902 B2 | 3/2022 | Snir |
| 2002/0016547 A1 | 2/2002 | Bang |
| 2002/0044082 A1 | 4/2002 | Woodington |
| 2002/0130807 A1 | 9/2002 | Hall |
| 2003/0151476 A1 | 8/2003 | Salmela |
| 2004/0021599 A1 | 2/2004 | Hall |
| 2004/0150552 A1 | 8/2004 | Barbella |
| 2004/0164891 A1 | 8/2004 | Schoeberl |
| 2004/0196172 A1 | 10/2004 | Wasiewicz |
| 2005/0083199 A1 | 4/2005 | Hall |
| 2005/0156780 A1 | 7/2005 | Bonthron |
| 2005/0232182 A1 | 10/2005 | Shattil |
| 2005/0288588 A1 | 12/2005 | Weber |
| 2006/0012511 A1 | 1/2006 | Dooi |
| 2007/0040728 A1 | 2/2007 | Nishimura |
| 2007/0171123 A1 | 7/2007 | Nakano |
| 2007/0205847 A1 | 9/2007 | Kushta |
| 2007/0285302 A1 | 12/2007 | Aarseth |
| 2008/0111686 A1 | 5/2008 | Hall |
| 2008/0136718 A1 | 6/2008 | Tietjen |
| 2008/0258964 A1 | 10/2008 | Schoeberl |
| 2008/0284641 A1 | 11/2008 | Spreadbury |
| 2008/0317345 A1 | 12/2008 | Wiedemann |
| 2009/0079617 A1 | 3/2009 | Shirakawa |
| 2009/0085800 A1 | 4/2009 | Alland |
| 2010/0074620 A1 | 3/2010 | Linnartz |
| 2010/0141508 A1 | 6/2010 | Nguyen |
| 2011/0037643 A1 | 2/2011 | Torin |
| 2011/0122014 A1 | 5/2011 | Szajnowski |
| 2011/0279669 A1 | 11/2011 | Longstaff |
| 2012/0056780 A1 | 3/2012 | Antonik |
| 2012/0112955 A1 | 5/2012 | Ando |
| 2012/0146846 A1 | 6/2012 | Antonik |
| 2012/0169523 A1 | 7/2012 | Lee |
| 2012/0235859 A1 | 9/2012 | Hayase |
| 2012/0313810 A1 | 12/2012 | Nogueira-Nine |
| 2013/0009806 A1 | 1/2013 | Newman |
| 2013/0027240 A1 | 1/2013 | Chowdhury |
| 2013/0234880 A1 | 9/2013 | Lee |
| 2013/0257670 A1 | 10/2013 | Sovero |
| 2014/0022113 A1 | 1/2014 | Nogueira-Nine |
| 2014/0079248 A1 | 3/2014 | Short |
| 2014/0105043 A1 | 4/2014 | Reves Balleste |
| 2014/0211438 A1 | 7/2014 | Lin |
| 2014/0218226 A1 | 8/2014 | Raz |
| 2014/0320231 A1 | 10/2014 | Seler |
| 2014/0355385 A1 | 12/2014 | Inagaki |
| 2015/0042507 A1 | 2/2015 | Jeong |
| 2015/0061928 A1 | 3/2015 | Cornic |
| 2015/0268329 A1 | 9/2015 | Yannone |
| 2015/0323650 A1 | 11/2015 | Schuman |
| 2016/0018511 A1 | 1/2016 | Nayyar |
| 2016/0025839 A1 | 1/2016 | Trummer |
| 2016/0061942 A1 | 3/2016 | Rao |
| 2016/0061947 A1 | 3/2016 | Patole |
| 2016/0084941 A1 | 3/2016 | Arage |
| 2016/0131738 A1 | 5/2016 | Prechtel |
| 2016/0131752 A1 | 5/2016 | Jansen |
| 2016/0139254 A1 | 5/2016 | Wittenberg |
| 2016/0187477 A1 | 6/2016 | Wang |
| 2016/0285611 A1 | 9/2016 | Fischer |
| 2016/0291146 A1 | 10/2016 | Wang |
| 2016/0334502 A1 | 11/2016 | Ali |
| 2016/0377711 A1 | 12/2016 | Arage |
| 2017/0029107 A1* | 2/2017 | Emami ............... G01S 13/582 |
| 2017/0102452 A1 | 4/2017 | Lilburn |
| 2017/0131394 A1 | 5/2017 | Roger |
| 2017/0219689 A1 | 8/2017 | Hung |
| 2017/0307744 A1 | 10/2017 | Loesch |
| 2017/0328990 A1 | 11/2017 | Magee |
| 2017/0343648 A1 | 11/2017 | Trotta |
| 2018/0011170 A1 | 1/2018 | Rao |
| 2018/0045819 A1 | 2/2018 | Cornic |
| 2018/0074168 A1 | 3/2018 | Subburaj |
| 2018/0095162 A1 | 4/2018 | Fetterman |
| 2018/0095173 A1 | 4/2018 | Kurono |
| 2018/0149736 A1 | 5/2018 | Alland |
| 2018/0159246 A1 | 6/2018 | Raphaeli |
| 2018/0166794 A1 | 6/2018 | Raphaeli |
| 2018/0172815 A1 | 6/2018 | McKitterick |
| 2018/0172816 A1 | 6/2018 | Chiu |
| 2018/0188317 A1 | 7/2018 | Maiellaro |

(56) References Cited

U.S. PATENT DOCUMENTS

| | | |
|---|---|---|
| 2018/0204358 A1 | 7/2018 | An |
| 2018/0350751 A1 | 12/2018 | Sun |
| 2019/0004167 A1 | 1/2019 | Rao |
| 2019/0050372 A1 | 2/2019 | Zeng |
| 2019/0212428 A1 | 7/2019 | Santra |
| 2019/0235066 A1 | 8/2019 | Lida |
| 2019/0265346 A1 | 8/2019 | Hakobyan |
| 2019/0324136 A1 | 10/2019 | Amadjikpe |
| 2019/0339382 A1 | 11/2019 | Hess |
| 2020/0003884 A1 | 1/2020 | Arkind |
| 2020/0011968 A1 | 1/2020 | Hammes |
| 2020/0176393 A1 | 6/2020 | Ketterson |
| 2020/0241672 A1 | 7/2020 | Kushnir |
| 2020/0301002 A1 | 9/2020 | Wu |
| 2020/0388578 A1 | 12/2020 | Lim |
| 2020/0393536 A1 | 12/2020 | Stettiner |
| 2021/0156980 A1 | 5/2021 | Stettiner |
| 2021/0156981 A1 | 5/2021 | Stettiner |
| 2021/0156982 A1 | 5/2021 | Stettiner |
| 2021/0184340 A1 | 6/2021 | Stav |
| 2021/0263147 A1 | 8/2021 | Bauer |
| 2021/0275056 A1 | 9/2021 | McMahon |
| 2021/0293923 A1 | 9/2021 | Arkind |
| 2021/0318413 A1 | 10/2021 | Arkind |
| 2021/0320425 A1 | 10/2021 | Arkind |

FOREIGN PATENT DOCUMENTS

| | | |
|---|---|---|
| CN | 101285886 A | 10/2008 |
| CN | 101592842 A | 12/2009 |
| CN | 101779147 A | 7/2010 |
| CN | 101793960 A | 8/2010 |
| CN | 101950851 A | 1/2011 |
| CN | 102819017 A | 12/2012 |
| CN | 102866401 A | 1/2013 |
| CN | 103136762 A | 6/2013 |
| CN | 104793192 A | 7/2015 |
| CN | 105814262 A | 7/2016 |
| CN | 105842700 A | 8/2016 |
| CN | 106100696 A | 11/2016 |
| CN | 106249219 A | 12/2016 |
| CN | 107356920 A | 11/2017 |
| CN | 107683422 A | 2/2018 |
| CN | 108089163 A | 5/2018 |
| DE | 102011083756 A1 | 4/2013 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 2390679 A1 | 11/2011 |
| EP | 3098623 A1 | 11/2016 |
| EP | 3165941 A1 | 5/2017 |
| EP | 3339894 A1 | 6/2018 |
| GB | 2462148 A | 2/2010 |
| WO | 2008/143943 A1 | 11/2008 |
| WO | 2013/101684 A1 | 7/2013 |
| WO | 2015/075072 A1 | 5/2015 |
| WO | 2015/126505 A2 | 8/2015 |
| WO | 2016/188895 A1 | 12/2016 |
| WO | 2017/069679 A1 | 4/2017 |
| WO | 2017/208670 A1 | 12/2017 |
| WO | 2018/138725 A1 | 8/2018 |
| WO | 2018/142395 A1 | 8/2018 |
| WO | 2018/142396 A1 | 8/2018 |
| WO | 2020/049562 A1 | 3/2020 |

OTHER PUBLICATIONS

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPCO.2017.8081546 [retrieved on Oct. 23, 2017].

Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).

Podder et al., Comparative Performance Analysis of Hamming, Hanning and Blackman Window, International Journal of Computer Applications (0975-8887) vol. 96—No. 18, Jun. 2014 (Year: 2014).

Research on LFMCW Radar Signal Processing Technology Based on DSP.

U. Prechtel et al: "Short-range MIMO radar system considerations", 2012 6th European Conference on Antennas and Propagation (EUCAP), Mar. 1, 2012 (Mar. 1, 2012), pp. 1742-1745, XP055147564, DOI: 10.1109/EuCAP.2012.6206599, ISBN: 978-1-45-770919-7.

* cited by examiner

EFFICIENT DIRECTION OF ARRIVAL ESTIMATION USING LOW RANK APPROXIMATION

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to an efficient mechanism for estimating direction of arrival (DOA) using a low rank approximation (LRA) technique.

BACKGROUND OF THE INVENTION

In recent years many industries are moving to autonomous solutions such as the automotive industry, deliveries etc. These autonomous platforms should operate in the environment while interacting with both the stationary and moving objects. For this purpose, these systems require a sensor suite which allows them to sense their surrounding in a reliable and efficient manner. For example, in order for an autonomous car to plan its route on a road with other cars on it, the trajectory planner must have a 3D map of the environment with indication of moving objects.

Visual sensors are also degraded by bad weather and poor visibility due to fog, smoke, sand, storms, etc.). They are also limited in estimating radial velocities. Light Detection And Ranging (LIDAR) devices are used to measure distance to a target by illuminating that target with a laser light. These devices, however, are expensive, have moving parts, and have very limited range. Radar is an augmenting and not a replacing technology.

Due to natural limitations of visual sensors in range accuracy and reliability problems with optical (e.g., laser) technologies, the best solution to generate this 3D map is via a radar technology. This imposes a new set of requirements which modern radars do not comply with.

Generally, the larger the aperture of the receiving antenna, the more radiation is received which results in higher sensitivity, or equivalently, a narrower main lobe. Hence, the receiving antenna can receive weaker signals and provide a relatively accurate indication regarding their direction.

On the other hand, vehicular radars, including automotive imaging radars, typically have smaller apertures. Although automotive radars transmit relatively weak signals since they are limited by power consumption and regulation, depending on the link-budget, they may require less sensitivity since the range is relatively short and the signals that are reflected from a target are relatively strong. Vehicular radars, however, are not required to detect point targets, such as an aircraft detected by a missile, but do require high accuracy in order to provide an image of the environment information which is used an input to one or more tracking and post-processing algorithms and/or a Simultaneous Localization And Mapping (SLAM) algorithm which detects the location of obstacles such as other cars or pedestrians in close vicinity to generate an object list from the raw radar detections. A narrow lobe with high accuracy will be able to provide sharper contour lines of the target image. The lobe width is determined solely by the equivalent aperture, normalized to the wavelength of the transmitted radar signal and not by the number of receiving antenna elements within the aperture, which affects the sensitivity, i.e. the ability to detect weak reflected signals, and ambiguity resolution and the side lobes level.

Another critical performance parameter of imaging radars is the side lobe levels of the antenna array. The side lobes reflected off strong targets may mask weak targets or cause false detections. For example, a large object such as a wall located in the direction of a side lobe causes reflections from the wall to appear in the main lobe. This will mask reflections that originate from an obstacle, such as a pedestrian, or create a phantom obstacle which may cause the vehicle to stop.

Therefore, in automotive imaging radars, it is critical to reduce side lobes as much as possible. In addition, there is a need for a compact radar switch array antenna having high azimuth and elevation angular resolution and accuracy that provides increased effective aperture, while using a low number of transmit (TX) and receive (RX) elements that meets cost, space, power and reliability requirements.

Recently, applications of radars in the automotive industry have started to emerge. High-end automobiles already have radars that provide parking assistance and lane departure warning to the driver. Currently, there is growing interest in self-driving cars and it is currently considered to be the main driving force in the automotive industry in the coming years.

Self-driving cars offer a new perspective on the application of radar technology in automobiles. Instead of only assisting the driver, automotive radars will be capable of taking an active role in the control of the vehicle. They are thus likely to become a key sensor of the autonomous control system of a vehicle.

Radar is preferred over other alternatives such as sonar or LIDAR as it is less affected by weather conditions and can be made very small to decrease the effect of the deployed sensor on the aerodynamics and appearance of the vehicle. Frequency Modulated Continuous Wave (FMCW) radar is a type of radar that offers several advantages compared to the others. For example, it ensures the range and velocity information of the surrounded objects can be detected simultaneously. This information is important for the control system of the self-driving vehicle to provide safe and collision-free operation.

For shorter range detection, as in automotive radar, FMCW radar is commonly used. Several benefits of FMCW radar in automotive applications include: (1) FMCW modulation is relatively easy to generate, provides large bandwidth, high average power, high accuracy, low cost due to low bandwidth processing and permits very good range resolution and allows the Doppler shift to be used to determine velocity, (2) FMCW radar can operate at short ranges with good performance, (3) FMCW sensors can be made small having a single RF transmission source with an oscillator that is also used to downconvert the received signal, (4) since the transmission is continuous, the modest output power of solid state components is sufficient.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles (especially cars) are increasingly equipped with technologies designed to assist the driver in critical situations. Besides cameras and ultrasonic sensors, car manufacturers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in time and frequency domains, even up to frequencies of 500 GHz.

There is also much interest now in using radar in the realm of autonomous vehicles which is expected to become more prevalent in the future. Millimeter wave automotive radar is suitable for use in the prevention of collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object illuminated by the transmitted radar signal.

Advanced driver assistance systems (ADAS) are systems developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources external to the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest growing segments in automotive electronics, with steadily increasing rates of adoption of industry wide quality standards, in vehicular safety systems ISO 26262, developing technology specific standards, such as IEEE 2020 for image sensor quality and communications protocols such as the Vehicle Information API.

In recent years many industries are moving to autonomous solutions such as the automotive industry, deliveries, etc. These autonomous platforms operate in the environment while interacting with both stationary and moving objects. For this purpose, these systems require a sensor suite which allows them to sense their surroundings in a reliable and efficient manner. For example, in order for an autonomous vehicle to plan its route on a road with other vehicles on it, the trajectory planner must have a 3D map of the environment with an indication of the moving objects.

Visual sensors are also degraded by bad weather and poor visibility (e.g., fog, smoke, sand, rainstorms, snowstorms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio. Such an automotive interference scenario with direct interference from several surrounding vehicles is shown in FIG. 1.

A well-known way to reduce the number of antenna elements in an array is by using a MIMO technique known as 'virtual array', where separable (e.g., orthogonal) waveforms are transmitted from different antennas (usually simultaneously), and by means of digital processing a larger effective array is generated. The shape of this 'virtual array' is the special convolution of the transmission and reception antennas' positions.

It is also known that by means of bandpass sampling, the de-ramped signal can be sampled with lower A/D frequencies, while preserving the range information of the targets with the ranges matching the designed bandpass filter.

Achieving a high resolution simultaneously in the angular, range and doppler dimensions is a significant challenge due to (inter alia) a linear increment in hardware complexity resolution.

In addition, direction of arrival (DOA) estimation is a key component in any radar system. For imaging radars, this is typically performed digitally, and is usually referred to as digital beam forming (DBF). Prior art methods that fall into this category include linear operations that can be implemented as a matrix multiplication. Other nonlinear methods are usually referred to as super resolution techniques. These techniques, however, require significantly higher computational power and are difficult to implement in a low-cost consumer sensor.

A problem with prior art DOA estimation techniques, however, is the number of calculations that are typically required. Usually the solution to the problem is to either (1) use additional computational power, (2) reduce the frame rate, or (3) reduce the number of range-doppler bins, or any combination of the above. It is thus desirable to have a radar system that performs DOA estimation without compromising on the parameters above and that presents a relatively low computational load. In addition, the radar should achieve a comparable side lobe level (SLL) as compared to prior art full DBF computations.

SUMMARY OF THE INVENTION

The present invention a system and method for direction of arrival (DOA) estimation having a complexity of order $O(N \log N)$, which allows a DOA dependent calibration. In one embodiment, the architecture comprises several fast Fourier transform (FFT) machines operating in parallel with coefficient multiplications before and after the FFT operations. These pre and post coefficients are computed using an optimal low rank approximation of a distortion matrix using singular value decomposition. The values of the pre and post calibration coefficients before and after the FFT operations for each rank are computed from the singular value decomposition of the distortion matrix $C=B/F$, where B is the digital beam forming (DBF) matrix and F is the ideal FFT matrix. A method of acquiring the beamforming matrix B is also disclosed.

The architecture implements K×N×log$_2$N operations which for relatively low rank is significantly smaller than the N$^2$ operations required for the complete matrix multiplication, where K is the rank of the approximation and N is the length of the fast Fourier transform. A circuit and method for computing the calibration coefficients and a simple proof that this approximates a general beam forming matrix is also disclosed.

There is thus provided in accordance with the invention, a method of estimating direction of arrival (DOA) of a signal for use in a radar system, comprising receiving input data, element wise multiplying the input data by a number of sets of pre-coefficients to yield a first plurality of results, performing a plurality of fast Fourier transform operations on said plurality of first results to generate a second plurality of results, element wise multiplying said second plurality of results by said number of sets of post-coefficients to yield a third plurality of results, and summing said third plurality of results to yield an approximate DOA estimation.

There is also provided in accordance with the invention, a method of estimating direction of arrival (DOA) of a signal for use in a radar system, comprising receiving input data x, multiplying each element of the input data x by k sets of pre-coefficients $V_k$ to yield k first results diag($V_k$)·x, performing k fast Fourier transform operations F on said k first results to generate k second results F·diag($V_k$)·x, element wise multiplying said k second results by k sets of post-coefficients $U_k$ to yield k third results $U_k$∘(F·diag($V_k$)·x), summing said k third results to yield an approximate DOA estimation y, and wherein said value k is a rank of said approximation.

There is further provided in accordance with the invention, an apparatus for estimating direction of arrival (DOA) of a signal for use in a radar system, comprising a radar signal processing circuit operative to receive a receive antenna array response x, said radar signal processing circuit operative to multiply each element of said antenna array response by k sets of pre-coefficients $V_k$ to yield k first results diag($V_k$)·x, perform k fast Fourier transform operations F on said k first results to generate k second results F·diag($V_k$)·x, element wise multiply said k second results by k sets of post-coefficients $U_k$ to yield k third results $U_k$∘(F·diag($V_k$)·x), sum said k third results to yield an approximate DOA estimation y, and wherein said value k is a rank of said approximation.

There is also provided in accordance with the invention, an automotive radar sensor, comprising a printed circuit board (PCB) assembly including a plurality of transmitting antennas fabricated on one side of said PCB assembly, a plurality of receiving antennas fabricated on an opposite side of said PCB assembly, and a transceiver coupled to said plurality of transmitting antennas and said plurality of receiving antennas, said transceiver operative to generate and supply transmitting signals to said one or more transmitting antennas and receive signals of a wave reflected back to said one or more receiving antennas, a radar signal processing circuit coupled to said transceiver and operative to receive input data x, multiply each element of said input data x by k sets of pre-coefficients $V_k$ to yield k first results diag($V_k$)·x, perform k fast Fourier transform operations F on said k first results to generate k second results F·diag($V_k$)·x, element wise multiply said k second results by k sets of post-coefficients $U_k$ to yield k third results $U_k$∘(F·diag($V_k$)·x), sum said k third results to yield an approximate DOA estimation y, and wherein said value k is a rank of said approximation.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION

Figure 1:
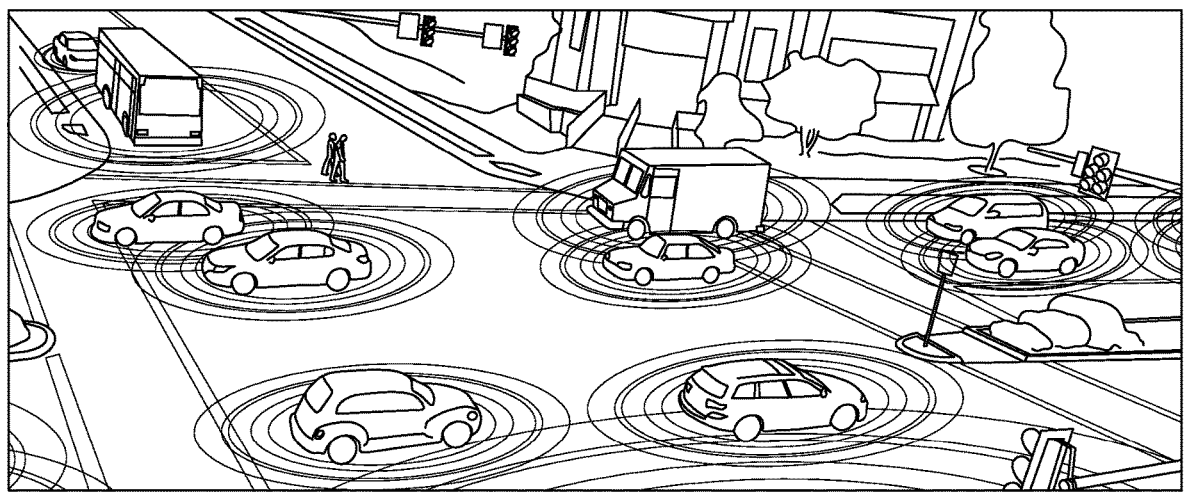
FIG. 1 is a diagram illustrating an example street scene incorporating several vehicles equipped with automotive radar sensor units.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 4:
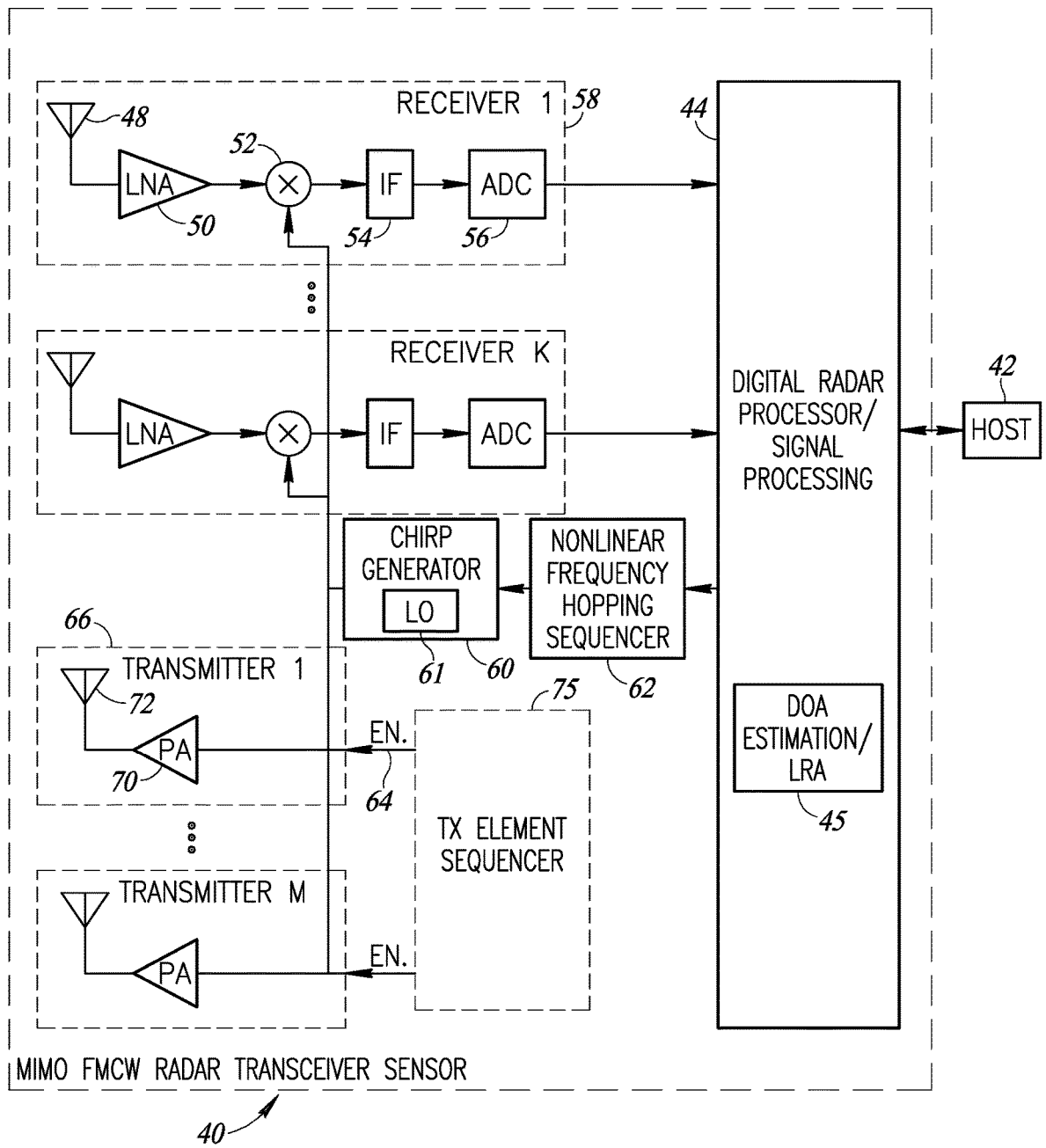
FIG. 4 is a high-level block diagram illustrating an example MIMO FMCW radar in accordance with the present invention.
Figure 5:
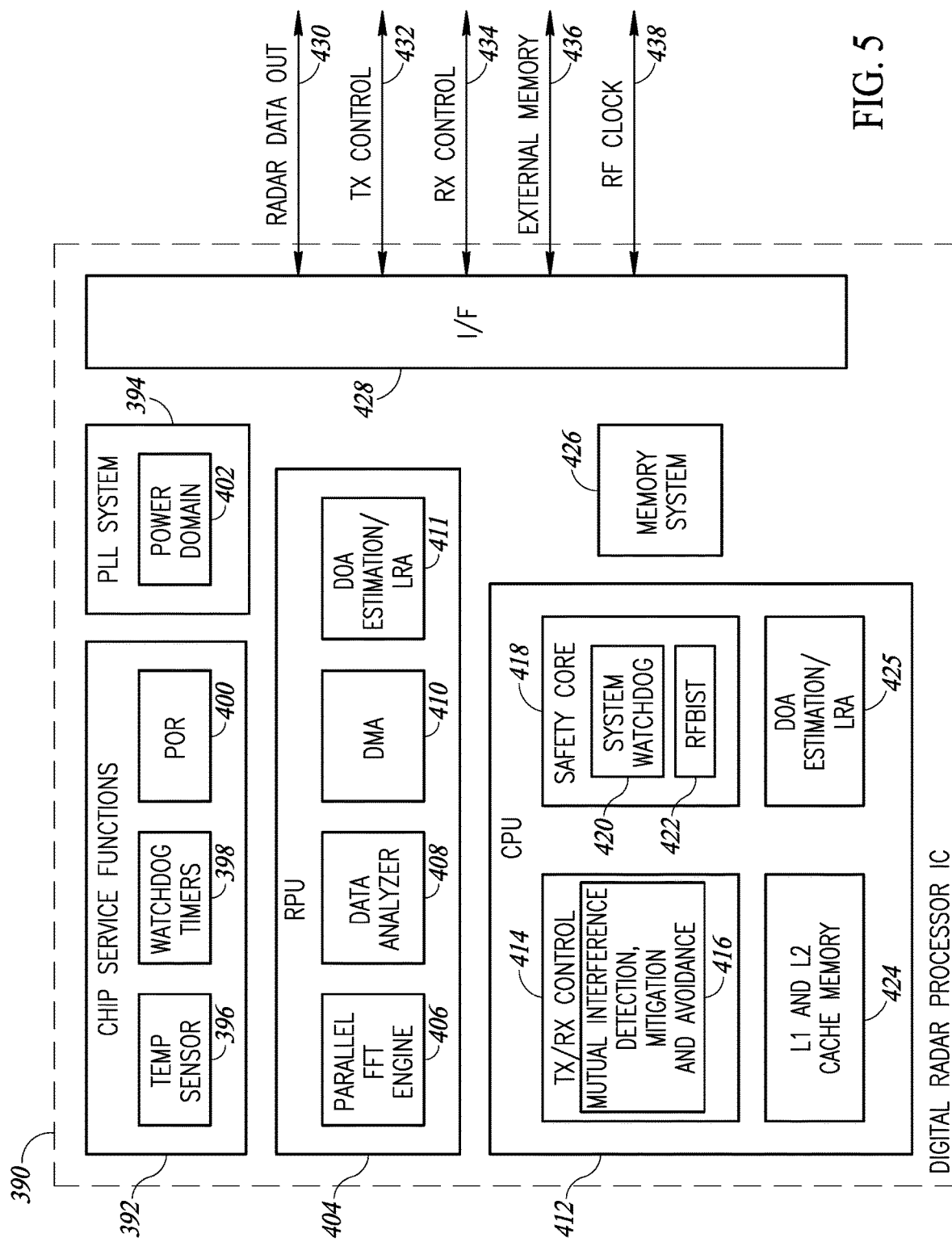
FIG. 5 is a block diagram illustrating an example digital radar processor (DRP) IC constructed in accordance with the present invention.

Frequency modulated continuous wave (FMCW) radars are radars in which frequency modulation is used. The theory of operation of FMCW radar is that a continuous wave with an increasing (or decreasing) frequency is transmitted. Such a wave is referred to as a chirp. An example of a chirp waveform 10 is shown in FIG. 4. A transmitted wave after being reflected by an object is received by a receiver. An example of a transmitted 12 and received (i.e. reflected) 14 chirp waveforms at the receiver is shown in FIG. 5.

Considering the use of radar for automotive applications, vehicle manufacturers can currently make use of four frequency bands at 24 GHz and 77 GHz with different bandwidths. While the 24 GHz ISM band has a maximum bandwidth of 250 MHz, the 76-81 GHz ultrawideband (UWB) offers up to 5 GHz. A band with up to 4 GHz bandwidth lies between the frequencies of 77 to 81 GHz. It is currently in use for numerous applications. Note that other allocated frequencies for this application include 122 GHz and 244 GHz with a bandwidth of only 1 GHz. Since the signal bandwidth determines the range resolution, having sufficient bandwidth is important in radar applications.

Conventional digital beam forming FMCW radars are characterized by very high resolution across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. Range measurement is obtained by performing a Fourier transform on the deramped signal, generated by multiplying the conjugate of the transmitted signal with the received signal. The radar range resolution is determined by the RF bandwidth of the radar and is equal to the speed of light c divided by twice the RF bandwidth. Doppler processing is performed by performing a Fourier transform across the slow time dimension, and its resolution is limited by the Coherent Processing Interval (CPI). i.e. the total transmission time used for Doppler processing.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transform, making it possible to calculate the speed of vehicles. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at non overlapping times. The reflected signals belonging to each transmitter antenna can be easily separated in the receiver antennas since either (1) orthogonal waveforms are used in the transmission, or (2) because they are received at non overlapping times. A virtual array is created that contains information from each transmitting antenna to each receive antenna. Thus, if we have M number of transmit antennas and N number of receive antennas, we will have M·N independent transmit and receive antenna pairs in the virtual array by using only M+N number of physical antennas. This characteristic of MIMO radar systems results in several advantages such as increased spatial resolution, increased antenna aperture, and possibly higher sensitivity to detect slowly moving objects.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

The radar of the present invention is operative to reduce complexity, cost and power consumption by implementing a time multiplexed MIMO FMCW radar as opposed to full MIMO FMCW. A time multiplexed approach to automotive MIMO imaging radar has significant cost and power benefits associated with it compared to full MIMO radars. Full MIMO radars transmit several separable signals from multiple transmit array elements simultaneously. Those signals need to be separated at each receive channel, typically using a bank of matched filters. In this case, the complete virtual array is populated all at once.

With time multiplexed MIMO, only one transmit (TX) array element transmits at a time. The transmit side is greatly simplified, and there is no need for a bank of matched filters for each receive (RX) channel. The virtual array is progressively populated over the time it takes to transmit from all the TX elements in the array.

Figure 2:
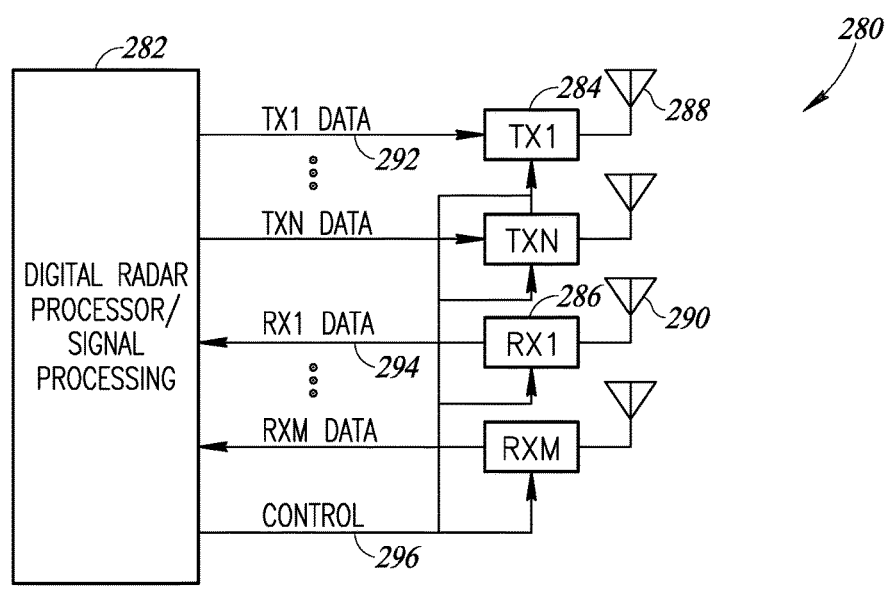
FIG. 2 is a diagram illustrating an example radar system incorporating a plurality of receivers and transmitters.

A high-level block diagram illustrating an example radar system incorporating a plurality of receivers and transmitters is shown in FIG. 2. The radar system, generally referenced 280, comprises a digital radar processor (DRP)/signal processor 282 for performing, inter alia, signal processing functions including the direction of arrival (DOA) estimation utilizing low rank approximation (LRA) mechanism of the present invention, a plurality N of transmitter devices TX1 to TXN 284, each coupled to a transmit antenna 288, a plurality M of receiver devices RX1 to RXM 286, each coupled to a receive antenna 290. TX data lines 292 connect the DRP to the transmitter devices, RX lines 294 connect the receiver devices to the DRP, and control signal 296 are provided by the DRP to each of the transmitter and receiver devices, 284, 286, respectively. Note that N and M may be any positive integer greater than one.

Figure 3:
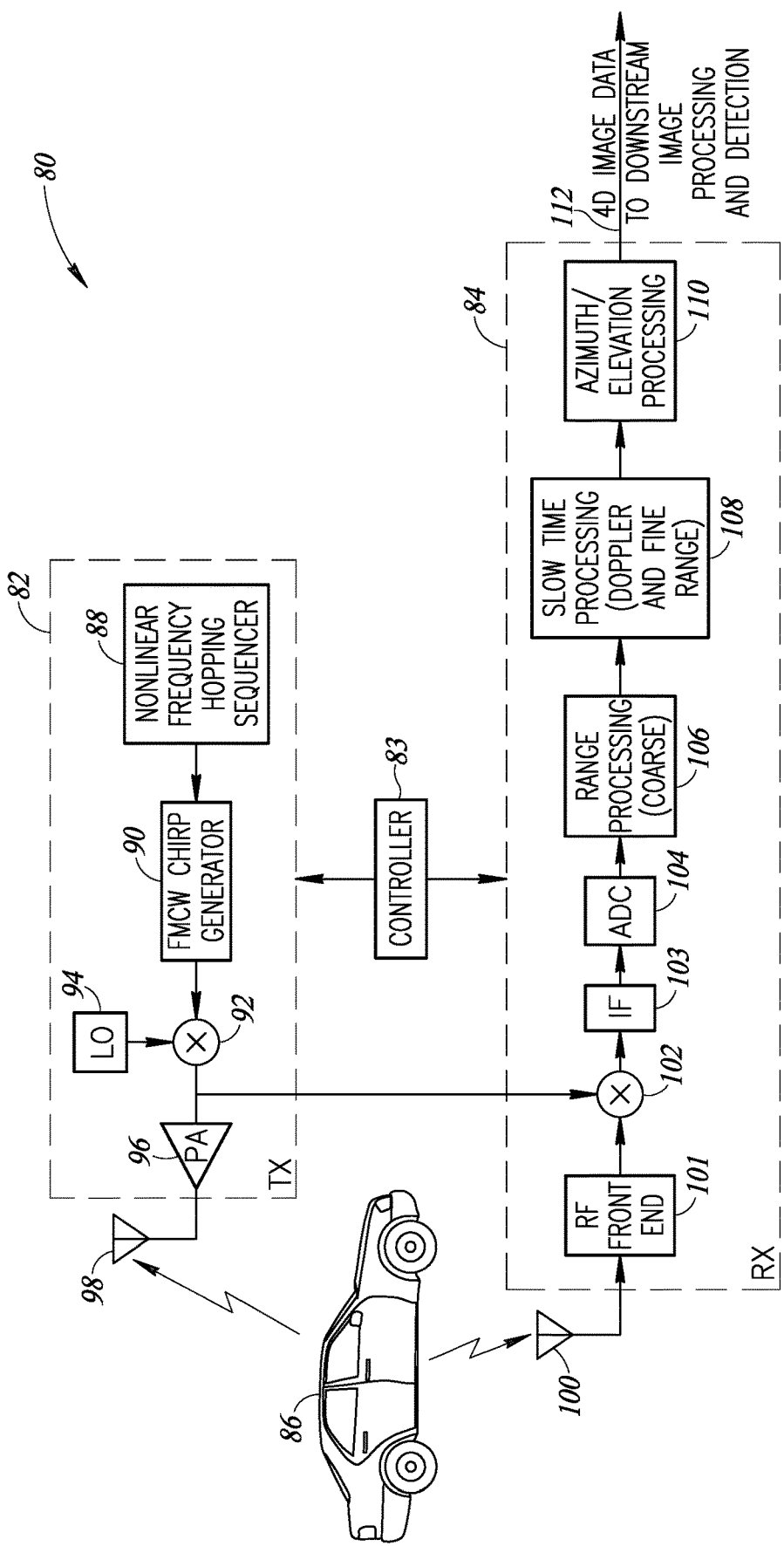
FIG. 3 is a diagram illustrating an example radar transceiver constructed in accordance with the present invention.

A diagram illustrating an example radar transceiver constructed in accordance with the present invention is shown in FIG. 3. The radar transceiver, generally referenced 80, comprises transmitter 82, receiver 84, and controller 83. The transmitter 82 comprises nonlinear frequency hopping sequencer 88, FMCW chirp generator 90, local oscillator (LO) 94, mixer 92, power amplifier (PA) 96, and antenna 98.

The receiver 84 comprises antenna 100, RF front end 101, mixer 102, IF block 103, ADC 104, fast time range processing 106, slow time processing (Doppler and fine range) 108, and azimuth and elevation processing 110.

In operation, the nonlinear frequency hopping sequencer 88 generates the nonlinear start frequency hop sequence. The start frequency for each chirp is input to the FMCW chirp generator 90 which functions to generate the chirp waveform at the particular start frequency. The chirps are upconverted via mixer 92 to the appropriate band in accordance with LO 94 (e.g., 80 GHz band). The upconverted RF signal is amplified via PA 96 and output to antenna 98 which may comprise an antenna array in the case of a MIMO radar.

On the receive side, the echo signal arriving at antenna 100—is input to RF front end block 101. In a MIMO radar, the receive antenna 100 comprises an antenna array. The signal from the RF front end circuit is mixed with the transmitted signal via mixer 102 to generate the beat frequency which is input to IF filter block 103. The output of the IF block is converted to digital via ADC 104 and input to the fast time processing block 106 to generate coarse range data. The slow time processing block 108 functions to generate both fine range and Doppler velocity data. Azimuth and elevation data are then calculated via azimuth/elevation processing block 110. The 4D image data 112 is input to downstream image processing and detection. Note that in one embodiment, azimuth/elevation processing block 110 implements the direction of arrival (DOA) estimation utilizing low rank approximation (LRA) mechanism of the present invention.

A high-level block diagram illustrating an example MIMO FMCW radar in accordance with the present invention is shown in FIG. 4. The radar transceiver sensor, generally referenced 40, comprises a plurality of transmit circuits 66, a plurality of receive circuits 58, ramp or chirp generator 60 including local oscillator (LO) 61, nonlinear frequency hopping sequencer 62, optional TX element sequencer 75 (dashed), and digital radar processor (DRP)/signal processing block 44 which in one embodiment includes block 45 that implements the direction of arrival (DOA) estimation utilizing the low rank approximation (LRA) mechanism of the present invention. In operation, the radar transceiver sensor typically communicates with and may be controlled by a host 42. Each transmit block comprises power amplifier 70 and antenna 72. The transmitters receive the transmit signal output of the chirp generator 60 which is fed to the PA in each transmit block. The optional TX element sequencer (dashed) generates a plurality of enable signals 64 that control the transmit element sequence. It is appreciated that DOA estimation may be implemented in a radar system with or without TX element sequencing and with or without MIMO operation. Further, DOA estimation is not limited to implementation in MIMO FMCW radars but may be implemented using other types of radar systems as well.

Each receive block comprises an antenna 58, low noise amplifier (LNA) 50, mixer 52, intermediate frequency (IF) block 54, and analog to digital converter (ADC) 56. Signal processing block 44 may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the term "processor" is meant to encompass a single or processing unit, multiple processors, processor multiple processing units, or other suitably configured computing element or elements.

For example, the processor may comprise one or more general purpose CPU cores and optionally one or more special purpose cores (e.g., DSP core, floating point, gate array, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by signal processing unit 44. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining coarse range, velocity (i.e. Doppler), fine range, elevation, azimuth performing interference detection, mitigation and avoidance, performing simultaneous locating and mapping (SLAM), etc.

A block diagram illustrating an example digital radar processor IC of the present invention is shown in FIG. 5. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408, direct memory access (DMA) circuit 410 and DOA estimation/LRA mechanism 411, CPU block 412 including TX/RX control block 414, safety core block 418, and L1 and L2 cache memory circuit 424 and DOA estimation/LRA mechanism 425, memory system 426 and interface (I/F) circuit 428. In one embodiment, the RPU is configured to implement the direction of arrival (DOA) estimation utilizing low rank approximation (LRA) mechanism of the present invention either in the RPU or in the CPU or partially in both.

The TX/RX control circuit 414 may incorporate settling time control for eliminating frequency source settling time, mutual interference, detection, mitigation, and avoidance block 416. The safety core block 418 includes system watchdog timer circuitry 420 and RFBIST circuit adapted to perform continuous testing of the RF elements in the radar system. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

In one embodiment, the DRP 390 is used in an automotive radar FMCW MIMO based system. Such a system requires a plurality of transmitter and receiver channels to achieve desired range, azimuth, elevation and velocity. The higher the number of channels, the better the resolution performance. Depending on the implementation, multiple transmit channels may be incorporated in a single chip and multiple receive channels may be incorporated in a single chip. The system may comprise multiple TX and RX chips. Each TX and RX chip is operable as part of a larger system adapted to achieve maximum system performance. In one embodiment, the system also includes at least one control channel. The control channel is operative to configure the both TX and RX devices.

The present invention provides a compact radar switch array antenna with high azimuth and elevation angular resolution and accuracy, and increased effective aperture, while using a low number of TX and RX elements. The invention also provides a compact radar antenna array with high azimuth and elevation angular resolution and accuracy, and increased effective aperture, while reducing unwanted side lobes.

One embodiment of the present invention is directed to a method for increasing the effective aperture of a radar switch/MIMO antenna array using a low number of transmit and receive array elements. An array of physical radar receive/transmit elements are arranged in at least two opposing RX rows and at least two opposing TX columns, such that each row includes a plurality of receive elements uniformly spaced from each other and each column includes a plurality of transmit elements uniformly spaced from each other, the array forming a rectangular physical aperture.

Used as a switch array, a first TX element from one column is activated to transmit a radar pulse during a predetermined time slot. Reflections of the first transmission are received by all RX elements, thereby virtually replicating the two opposing RX rows about an origin determined by the location of the first TX element within the rectangular physical aperture.

This process is repeated for all remaining TX elements during different time slots, thereby virtually replicating the two opposing RX rows about an origin determined by the location of each activated TX element within the rectangular physical aperture. During each time period, reflections of the transmission from each TX element are received by all RX elements. In this manner, a rectangular virtual aperture having dimensions twice the dimensions of the rectangular physical aperture is achieved with replicated two opposing RX rows. This virtual aperture determines the radar beam width and sidelobes.

Note that the above replication method works equally well in a MIMO or hybrid switch/MIMO design where some signals are transmitted simultaneously by a plurality of TX array elements using orthogonal waveforms which are later separated in the receiver.

Direction of Arrival (DOA) Estimation

Note that the DOA estimation/LRA mechanism of the present invention is applicable to numerous types of radars and is not intended to be limited to the example radar systems disclosed herein. For example, LRA beamforming is applicable to radars incorporating uniform linear arrays (ULAs) where all antenna sensors lie on a line and the distance between the adjacent sensors is identical for any two adjacent sensors. The MIMO FMCW radar is presented herein for example purposes only to aid in illustrating the principles of the DOA estimation mechanism of the present invention.

Digital beam forming (DBF) is a well-known technique for determining the direction in which the target is located also referred to as direction of arrival (DOA). An array antenna having a plurality of antenna elements is used to receive the reflected wave from the target. The direction of the target is determined by applying a direction of arrival (DOA) estimation method such as the well-known beam forming method.

In a direction of arrival estimation method, using for example an array antenna, the beam former method scans the main lobe of the array antenna in many directions and determines the direction in which the output power is the greatest as being the direction of arrival. Note that the width of the main lobe determines the angular resolution. Therefore, if it is desired to increase the resolution so that the direction of numerous targets can be determined, the aperture length of the array is preferably increased by increasing the number of antenna elements. The same is true of the min-norm method that determines the direction of arrival from the eigenvalue and eigenvector of the correlation matrix of the array's received signal, and its extended algorithms such as multiple signal classification (MUSIC) and estimation of signal parameters via rotational invariance techniques (ESPRIT). Considering these techniques, since the degree of the correlation matrix, i.e. the number of antenna elements, determines the number of targets that can be detected, the number of antenna elements is preferably increased in order to make it possible to determine the direction of many targets.

Typically, during the calibration process of the radar, a beam forming matrix is computed, and during DOA estimation, this matrix is multiplied by the array response vector. The DBF matrix consists of DOA dependent calibration vectors $\{b_1, \ldots, b_N\}$, where N is the number of DOA angles to be estimated (i.e. the number of angles to scan in azimuth and/or elevation), $b_i \in \mathbb{C}^P$, and P is the number of antenna elements. The DBF matrix B can thus be written as follows $$B = \begin{bmatrix} -b_1^T - \\ \vdots \\ -b_N^T - \end{bmatrix} \quad (1)$$

Let x be the array response, for example in a specific Doppler bin. The DOA estimate can then be expressed as follows $$y = Bx \quad (2)$$

Where $y \in \mathbb{C}^N$, and $|y_i|^2$ represent the energy that is received from direction i, $x \in \mathbb{C}^P$ represents the data on the virtual array row or column typically, but not necessarily, after range and doppler processing, and P denotes the length of the row or column of the virtual array. Note that y is the result of the beam forming which is a measure of how much energy was reflected from each direction. Each element $m_y$ corresponds to a different direction (i.e. angle). It can be considered as the frequency spectrum of the input data x.

For the special case of an ideal uniform linear array (ULA) the calibration vectors are the matched filter for the corresponding steering vector $a(\theta)$. Thus, $b_i \overline{a(\theta)_i}$, there the steering vectors have the following form $$a(\theta) = \left\{ 1, \exp\left(2\pi i \frac{d}{\lambda} \sin\theta\right), \ldots, \exp\left(2\pi i \frac{d}{\lambda}(P-1)\sin\theta\right) \right\} \quad (3)$$

where d is the distance between antenna elements and $\lambda$ is the signal wavelength. In this special case, a standard fast Fourier transform (FFT) operation can be used for DOA estimation as the matched filter for specific angles to be scanned, as provided in Equation (4) below.

$$\theta_i = \arcsin\left[\frac{\lambda \cdot i}{d \cdot N}\right], i \in \left\{-\frac{N}{2}, \ldots, \frac{N}{2} + 1\right\} \quad (4)$$

Where N≥P with N denotes the length of the FFT, and P represents the number of receive antenna elements. The value N is typically the smallest power of two greater than P. The result of this FFT operation is the well-known sinc response for each direction in the scan. Note that typically in practice, a window function is used prior to the FFT operation in order to reduce the side lobe level (SLL) of the sinc response.

One advantage of using the FFT operation over multiplication with the DBF matrix B is the reduced computational complexity. General matrix multiplication requires $N^2$ operations whereas an FFT computation requires only N log N operations. For a high resolution radar where the number of antenna elements is relatively high (e.g., P≈100), and the number of range-Doppler bins for which a DOA estimation must be performed is high, this difference in computational complexity is of great importance and a significant challenge for real time implementation. A problem arises, however, in that the low complexity FFT is only valid for ideal uniform arrays without any impairments.

Thus, for an ideal uniform linear antenna array a relatively simple FFT operation can be used with N log N operations for DOA estimation. In the real world, however, when the antenna patterns of the different elements are not identical due to manufacturing tolerances and other effects, a different complex correction vector for each DOA is used which functions to correct the antenna impairments as much as possible, i.e. using the digital beam forming (DBF) matrix. This operation takes $N^2$ operations (i.e. matrix multiplications), and in the case of high-resolution radar, where N might be more than 100 elements, this operation needs to be done for every range doppler (twice in the case of azimuth and elevation). This fact makes the standard calculation unfeasible for such radar systems.

Low Rank Approximation (LRA) of DBF DOA Estimation

Solutions to the above problem include applying additional computational power, reducing the frame rate, and/or reducing the number of range-doppler bins. Alternatively, a low rank approximation based DOA mechanism can be used which attempts to solve the above problems while requiring relatively low computational load and that does not compromise on other parameters. Further, the LRA based DOA mechanism achieves comparable SLL to the full DBF computation.

In practice, when a ULA is used (i.e. not necessarily dense), even when considering an array with impairments, the DBF matrix is similar to an FFT matrix with additional constant phase gain calibration. Hence, it can be written $$B \approx F \cdot \text{diag}(w) = \begin{bmatrix} 1 & \cdots & 1 \\ \vdots & \ddots & \vdots \\ 1 & e^{-2\pi i \frac{jk}{N}} & e^{-2\pi i \frac{(P-1)k}{N}} \\ \vdots & & \ddots & \vdots \\ 1 & \cdots & & e^{-2\pi i \frac{(P-1)(N-1)}{N}} \end{bmatrix} \quad (5)$$

where B is the DBF matrix, F is the FFT or DFT matrix, w is the constant phase gain calibration and window. Note that the DBF matrix B can be derived using the technique described infra or using any other well-known method. Note also that Equation (5) represents an FFT matrix with distortion to show the type of estimators the mechanism of the invention is attempting to determine. The actual method of computing B is not critical for the present invention as the mechanism approximates B regardless of how it is calculated (if it is similar enough to an FFT matrix). The matrix F is computed for the spatial frequencies (DOAs) corresponding to the N directions resulting from the beam forming matrix B operation. Without loss of generality, Equation (5) can be expressed as $$B = F \cdot (I + \epsilon) \cdot \text{diag}(w) \quad (6)$$

where I is the identity matrix and E corresponds to the distortion of the array from the ideal ULA.

Figure 6:
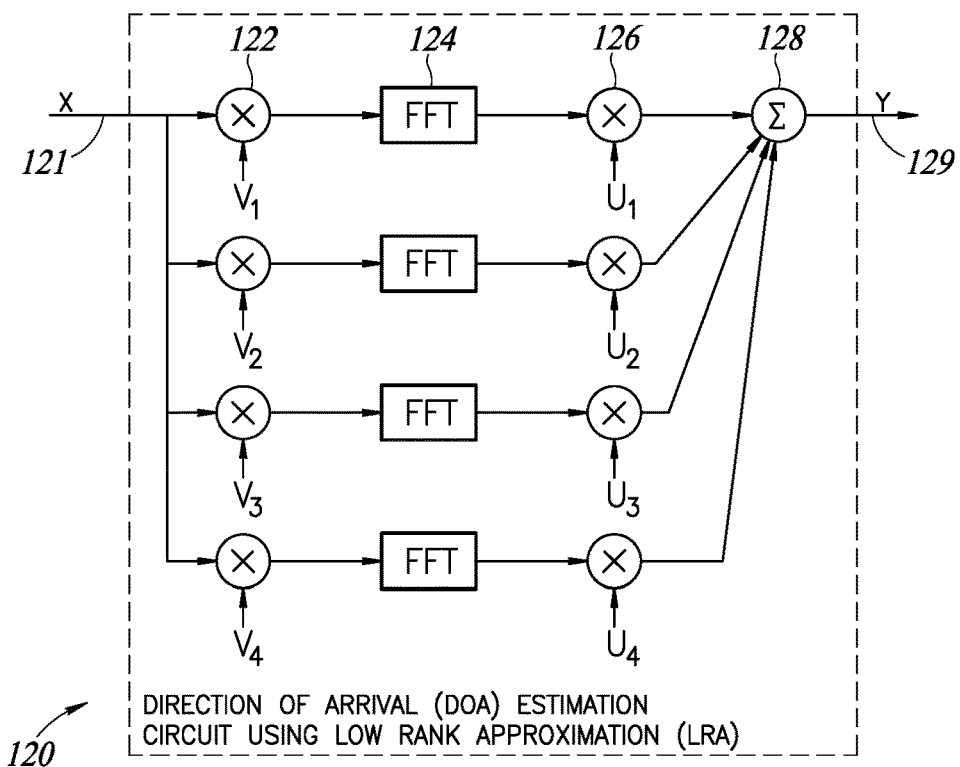
FIG. 6 is a high-level block diagram illustrating an example direction of arrival (DOA) estimation using low rank approximation (LRA) technique.
Figure 7:
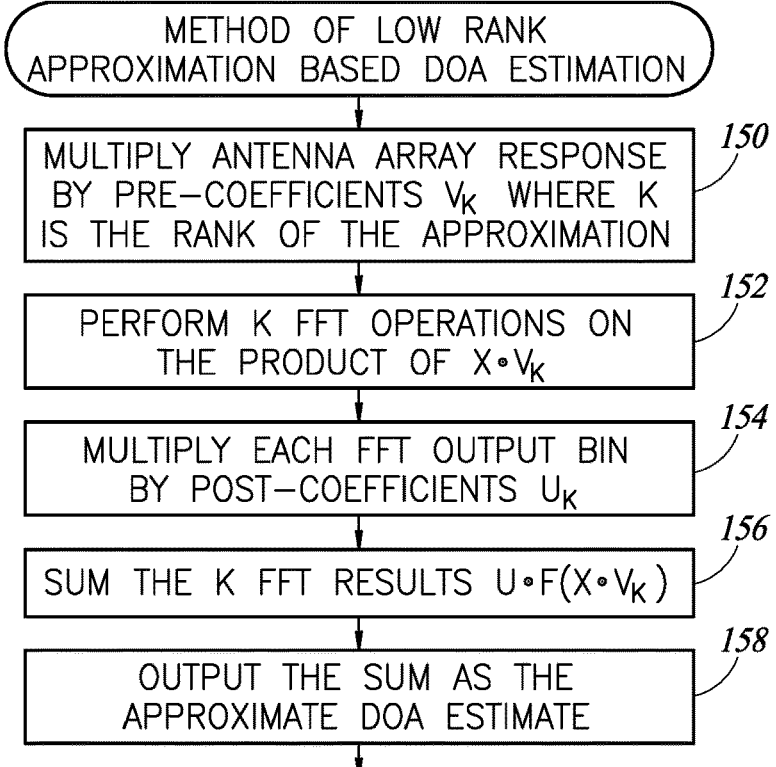
FIG. 7 is a diagram illustrating an example method of low rank approximation based DOA estimation.

A high-level block diagram illustrating an example low rank approximation of a DBF DOA estimation is shown in FIG. 6. The LRA circuit, generally referenced 120, comprises a plurality of pre-multipliers 122, FFT computation blocks 124, post-multipliers 126, and adder 128. A diagram illustrating an example method of low rank approximation based DOA estimation is shown in FIG. 7.

The LRA approximation method of the present invention takes advantage of the fact that B is similar to the FFT matrix F. In one embodiment, it uses K FFT machines 124 working in parallel, where K is the rank of the approximation. Before each FFT operation, the antenna array response x 121 is multiplied via multipliers 122 by a set of coefficients called pre-coefficients $V_k$ (step 150). An FFT is then performed in each of the multiplication results X·V (step 152). Similarly, following each FFT operation, each FFT bin is multiplied via multipliers 126 by a different set of coefficients called post-coefficients $U_k$ (step 154). The K results U∘F(X∘V) of the FFT operations are summed together via adder 128 (step 156) to generate the output y 129 of the approximate DOA estimation method (step 158 where the '∘' operator represents the well-known Hadamard product or element wise multiplication.

FIG. 6 thus illustrates a K-rank approximation to a matrix multiplication of a DBF matrix. This approximation assumes that even if the antenna array is not ideal, it is close to an FFT matrix, with some deviations. In one embodiment, the values of the calibration coefficients before and after the FFT operations for each rank are computed from the singular value decomposition of the distortion matrix C=B/F (i.e. element-wise or Hadamard division), where B is the DBF matrix and F is the ideal FFT matrix. This architecture implements $K \times N \times \log_2 N$ operations which for low rank is significantly smaller than the $N^2$ operations required for the complete matrix multiplication. In practice it was found that a rank of four is sufficient for compensating for 3D phase center misalignment and weak leakage between antenna channels. Thus, the largest four values are used, and the remaining values are zeroed. This is the optimal low rank approximation of the distortion matrix C.

Note that for K=P the approximation is perfect and can implement any desired DBF matrix. This, however, is even more computationally intensive than the matrix multiplication described supra. In one embodiment, it is possible to choose K>>P while still achieving a highly accurate approximation. For an ideal ULA antenna K=1 is sufficient, and in fact equivalent to a single FFT operation where the input and output are multiplied by constant vectors. In an example embodiment, a value of four is chosen for K which yields satisfactory results (i.e. the four largest singular values). This is shown in FIG. 6 where the example circuit utilizes four pre multipliers, four FFT calculation blocks, and four post multipliers. It is appreciated that the LRA mechanism of the present invention can be implemented using any desired rank in accordance with the particular application.

It is noted that in a high resolution radar, the amount of data that is required to be processed is typically huge. In one embodiment, a matched filter, i.e. maximum likelihood (ML), is used to estimate DOA. Other techniques are typically more compute intensive. In the case of a uniform linear array (ULA), the matched filter becomes an FFT, specifically for a ULA. Note that due to the computational efficiency of FFTs, the use of any other alternative method is likely to require a larger number of computations.

For example, consider a radar with 256 range bins, 1024 Doppler bins resulting in a total of 256×1024=262,144 range-doppler bins, N=128 azimuth bins and M=32 elevation bins. In the case of an ideal ULA, it is possible to perform ML spatial processing (i.e. azimuth and elevation) via FFT, with a complexity of $N \times M \times \log_2(N \times M) \approx 50e3$. For a non-ULA array, however, full matrix multiplication is required, with a complexity of $N \times M \times (N+M) \approx 655e3$, an increase by a factor of more than 13. Considering that spatial processing is performed for every range-doppler bin, full matrix multiplication requires approximately 158 billion more computations per CPI. Such a high number of computations, however, is not practical in a low cost consumer radar sensor.

Existing radars in the market typically have relatively small array sizes, e.g., 3×4, 6×8, 12×16. For radars with small arrays, the processing load to estimate DOA is doable and can even be performed in software. Even with an array of size only 12×16, however, the number of calculations (i.e. multiplications) becomes prohibitive and a hardware solution is required. Thus, prior art techniques using $N^2$ calculations are not practical for radars of larger array sizes such as 48×48. The LRA method described herein, having a complexity of $K \times N \times \log_2 N$, is much closer in efficiency to a 'pure' or 'full' FFT DBF mechanism, but yields performance that is sufficiently close to full matrix multiplication methods.

To overcome these problems, in one embodiment, the DOA estimation mechanism of the present invention uses a maximum likelihood estimation (MLE) matched filter, which is not ideal. The MLE matched filter provides a metric for the amount of energy coming from a particular direction. A vector 'b' is generated as in Equation (1) specifically for a particular azimuth or elevation angle, e.g., 25 degrees. These can be considered FFT coefficients that are complex numbers that correspond to certain Fourier frequencies. These coefficients are actually measuring spatial frequency. Regarding radar antennas, a spatial frequency infers a direction in the phased array. This is the method of computing the amount of energy received from 25 degrees direction. This can be repeated for all desired DOA angles $X_1 \ldots X_P$ to be scanned, i.e. a linear combination of targets. This standard model is for phased array and is referred to as the steering vector. The matched filter is exactly the complex conjugate.

Each vector 'b' corresponds to $\theta_1, \ldots \theta_N$ directions. As shown earlier, with a large number of virtual antennas (e.g., 128), the number of calculations becomes prohibitively large. The resolution of the radar is related to the size of the aperture. The radar with larger separation between elements has the bigger aperture and this means having a narrower beam width which provides better resolution. Regardless of the size of the aperture, however, the number of DOA calculations required is related to the number of elements.

It is noted that even though the radar does not transmit from all elements at the same time like in prior art phased array radars, it is mathematically the same. For example, the signals transmitted from multiple antennas simultaneously are combined in the air. In DBF, the signals received by the multiple receive antenna elements are summed digitally. Mathematically, this represents the same thing. Nonetheless, it is noted that the technique described in the present invention is applicable to any DBF setup, whether TD-MIMO, simultaneous transmit MIMO (such as OFDM) or even a full ULA of receivers with a single transmitter.

In one embodiment, the receive antenna elements are organized as a ULA. For each direction there is a different set of coefficients. In a standard beam forming scheme, with an ideal ULA, this matrix becomes a discrete Fourier transform (DFT) matrix for a specific $\{\theta_k\}$. A set of angles is chosen and a given set of frequencies are computed very efficiently. In an FFT, it is desirable to take advantage of symmetry, e.g., even and odd, positive and negative, etc. A matched filter is computed for a specific set of frequencies. DOA estimation is typically for a specific set of frequencies. Thus, in the case of a ULA and a selected group of DOAs, standard FFT operations can be used.

In one embodiment, the data is multiplied by a calibration window vector and then the DFT is performed as a matrix multiplication. This forms the output of the system before the SLAM.

Thus, in general, it is desired to compute the quantity B·X but it is normally of order $O(N^2)$ which required too many calculations. Instead, the quantity B·X is approximated as described supra using FFT operations. Note that the equations approximating the calculation of B are not an FFT matrix but are sufficiently close to it. The distortion matrix is computed using B which is calculated using any desired well-known technique. The assumption that B is close to FFT is made and the distortion matrix is computed using B. Singular value decomposition (SVD) is then computed to determine the pre and post coefficients.

In one embodiment, the DOA estimation mechanism can be elegantly and efficiently implemented in hardware with X representing the virtual element array. After range/doppler processing the DOA estimates are calculated. For each range, doppler, and row in the virtual array, the azimuth processing is performed representing 256×1024×128=33.5 million calculations. If elevation is to be estimated as well, an additional 33.5 million calculations are performed, assuming the same resolution for azimuth and elevation. Note that for elevation, different coefficients may be used as well as different rank, as rank for azimuth and elevation are not required to be same and can be different. The higher the rank, the better the approximation. The rank and other related parameters may be programmed and selected dynamically.

Determination of Beamforming Matrix B

In the following we disclose a method for measuring the beamforming matrix B, by inversion of the array response matrix A.

Recall that the beamforming matrix is defined by the relation $$y=Bx \quad (7)$$

where $y \in \mathbb{C}^N$ and $|y_n|^2$ represents the energy that is received from direction $n \in [1, N]$. $x \in \mathbb{C}^P$ represents the complex-valued data present in the virtual array row or column typically, but not necessarily, after range and Doppler processing, and P denotes the length of the row or column of the virtual array.

While in general each direction N can represent any arbitrary angle of choice, in Fourier beamforming (or beamforming that is closely related to Fourier beamforming, as is the case in the present invention) the N possible values of angles are determined by the input wavelength $\lambda$, the array spacing d and the FFT length $N_{FFT}$ as follows:

$$\Theta_{N_{FFT}} = \Big\{\theta_n = \qquad (8)$$
$$\sin^{-1}\Big[\frac{\lambda n}{d \cdot N_{FFT}}\Big]\Big| n \in \Big\{-\frac{N_{FFT}}{2}, -\frac{N_{FFT}}{2}+1, \ldots, -\frac{N_{FFT}}{2}+N_{FFT}-1\Big\}\Big\}$$

Note that $N_{FFT} > P$ and is typically a power of 2 (due to FFT efficiency), while P is determined by the extent of the virtual row or column and is generally not constrained to be a power of 2. We name the angles corresponding to the special case where $N_{FFT} = P$ as the natural or orthogonal angles as they correspond to the orthogonal (spatial) frequencies of a DFT of length P.

The array response matrix is defined by the reciprocal relation to Equation (7) as follows $$x=\text{diag}(w)^{-1}A\tilde{y} \quad (9)$$

where $\tilde{y}$ represents the complex backscattering distribution of the environment (typically but not necessarily at a Range-Doppler bin), $\tilde{y}_n$ represents this complex backscattering at angle of arrival $\theta_n$, $n \in [1, N]$, w is a constant phase-gain calibration and windowing vector, and $\text{diag}(w)^{-1}$ is the inverse to a diagonal matrix that has the elements of w on its diagonal (and is also a diagonal matrix). Note that $\tilde{y}$ is a property of the environment (i.e. what exists in the environment), and it differs in principle from y, which is the perceived environment via the beamforming Equation (7). We multiply from the left with diag(w) and use the definition representing constant phase gain calibrated data $\tilde{x} = \text{diag}(w)x$ to rewrite Equation (9) as $$\tilde{x}=\text{diag}(w)x=A\tilde{y} \quad (10)$$

In index notation, the $p^{th}$ element is given by $$\tilde{x}_p = \sum_{n=1}^{N} A_{p,n}\tilde{y}_n \quad (11)$$

Note that A is of dimensions P×N.

If we construct a controlled measuring setup (e.g., in anechoic chamber, or an outdoor setup with minimal clutter) such that the environment has only a single point target of RCS R (which we set without loss of generality to one) and at angle $q_0$ then:

$$\tilde{y}_n = \delta_{q_0,n} \quad (12)$$

where ($\delta_{i,j}$ is the Kroenecker delta function).
We then have:

$$\tilde{x}_p^{q_0} = \sum_{n=1}^{N} A_{p,n}\delta_{q_0,n} = A_{p,q_0} \quad (13)$$

Note that the notation $\tilde{x}_p^{q_0}$ means the p-th element of the experiment where the target was at angle $q_0$, i.e. with this setup the data on virtual array, $\tilde{x}_p^{q_0}$, gives us a single column of the array response matrix, $A_{p,q_0}$. By repeating this experiment at different angles, we can in principle retrieve all the columns of the A matrix.

Note the required setup Equation (12), is an idealization that requires infinite signal-to-noise ratio (SNR), but for practical purposes it is achievable in a typical anechoic chamber within the ~3 dB field of view (FOV) around boresight As we move further away from this FOV, the SNR degrades to a point where Equation (12) no longer holds. The largest angle in which Equation (12) holds is called t $\theta_{FOV}$. We label the set of angles within this FOV as $\Theta_{in-FOV}^{measured}$.

$$\Theta_{in-FOV}^{measured} = \{\theta | \theta \leq \theta_{FOV}\} \quad (14)$$

We define the total number of angles measured within this FOV as Q. Thus, the measured array response $A_{measured}$ is of dimensions P×Q.

$$A_{measured} = \begin{bmatrix} | & | & | & | \\ \tilde{x}^{q_1} & \tilde{x}^{q_2} & \ldots & \tilde{x}^Q \\ | & | & | & | \end{bmatrix} \quad (15)$$

These Q measured angles are not constrained to belong to any angle grid. We proceed to interpolate the rows of the measured array response to the grid of angles defined by the array length P, i.e. we resample, using simple interpolation from the Q angles $\Theta_{in-FOV}^{measured}$ to the set $$\Theta_{in-FOV}^{measured} \underset{Interpolate}{\rightarrow} \Theta_{in-FOV}^{natural} \quad (16)$$

$$\Theta_{in-FOV}^{measured} = \quad (17)$$

$$\left\{ \theta_p = \sin^{-1}\left[\frac{\lambda p}{d \cdot p}\right] \middle| \theta_p \leq \theta_{FOV}, p \in \left\{-\frac{P}{2}, -\frac{P}{2}+1, \ldots, -\frac{P}{2}+P-1\right\}\right\}$$

The size of $\Theta_{in-FOV}^{natural}$, i.e. the number of angles within the FOV defined over the natural grid, is defined as $\tilde{P}$. Note that the angles $\Theta_{in-FOV}^{natural}$ correspond to the nulls of the sinc array response. Thus, after such interpolation we have $A_{interpolated}$ of dimensions P×$\tilde{P}$.

$$A_{interpolated} = \begin{bmatrix} | & | & | & | \\ \tilde{x}^{p_1} & \tilde{x}^{p_2} & \ldots & \tilde{x}^{\tilde{P}} \\ | & | & | & | \end{bmatrix} \quad (18)$$

In order to complete $A_{interpolated}$ to a P×P matrix we add the ideal array response vectors for all array null angles outside the FOV i.e. we add columns to the left and right of $A_{interpolated}$ such that $$A_{natural} = \begin{bmatrix} | & & | & | & & | & & | \\ v^1 & \ldots & \tilde{x}^{p_1} & \tilde{x}^{p_2} & \ldots & \tilde{x}^{\tilde{P}} & \ldots & v^P \\ | & & | & | & & | & & | \end{bmatrix} \quad (19)$$

where $v^p$ is the p-th row of the ideal array response (a Fourier matrix) on the grid of natural angles.

We assume that, like the beamforming matrix B, A differs slightly from an inverse Fourier transform matrix $\mathcal{F}^{-1}$:

$$\frac{A_{natural}}{P \times P} = \frac{\mathcal{F}^{-1}}{P \times P}\left(\frac{1}{P \times P} + \frac{\tilde{\epsilon}}{P \times P}\right) \quad (20)$$

Therefore, $$(1+\tilde{\epsilon})^{-1} = (\mathcal{F} A_{natural})^{-1} \quad (21)$$

This completes the inversion since $$\tilde{x} \equiv A\tilde{y} = \mathcal{F}^{-1}\left(1 + \frac{\tilde{\epsilon}}{P \times P}\right)\tilde{y} \quad (22)$$

$$\Rightarrow \tilde{y} = (1-\tilde{\epsilon})^{-1}\mathcal{F}\tilde{x} \quad (23)$$

Note that this yields a result $\bar{y} \in \mathbb{C}^P$, whereas we want a result in $\widetilde{y_{zp}} \in \mathbb{C}^N$. We therefore zero pad in the Fourier plane via $\mathcal{F}_{zp} \in \mathbb{C}^{N \times P}$.

$$\widetilde{y_{zp}} = \tfrac{z_p}{zz}\mathcal{F}^{-1}\tilde{y} = \tfrac{z_p}{zz}\mathcal{F}^{-1}(1+\tilde{\epsilon})^{-1}\mathcal{F}\tilde{x} \quad (24)$$

Calibration Coefficient Computation

Figure 8:
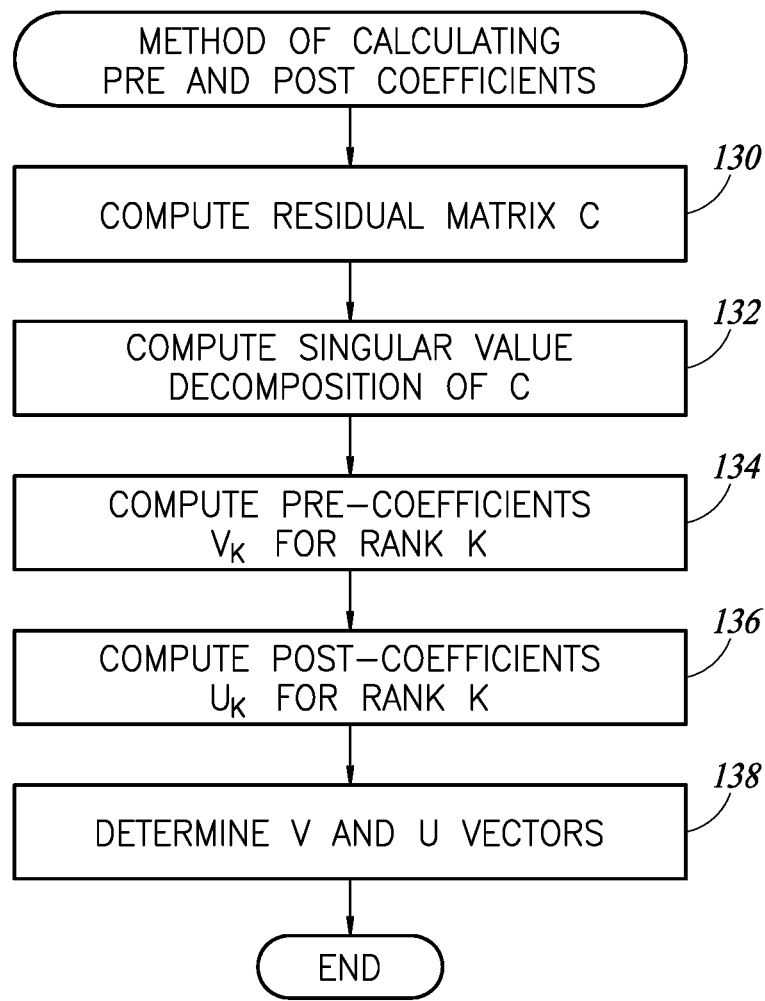
FIG. 8 is a diagram illustrating an example method of calculating pre and post coefficients.

A diagram illustrating an example method of calculating pre and post coefficients is shown in FIG. 8. In one embodiment, the coefficients in the LRA architecture are computed in an optimal manner user the assumption that the DBF matrix is similar to the FFT matrix. To do this, the residual matrix or distortion matrix C below is first computed (step 130) as follows $$C = B/F \quad (25)$$

where the division operation is performed element wise $C_{ij} = B_{ij}/F_{ij}$. In addition, C has the same dimensions as $B \in \mathbb{C}^{N \times P}$. Note that in the case of an ideal ULA, all elements of C are 1 and it has rank 1 as well. The singular value decomposition of C is then computed (step 132) as follows to generate V (step 134) and U (step 136), i.e. [U, S, V]=SVD(C). Thus, the decomposition of the distortion matrix C yields three matrices.

$$C = \tilde{U} \cdot \tilde{S} \cdot \tilde{V}^H \quad (26)$$

where $\tilde{V} \in \mathbb{C}^{P \times P}$, $\tilde{U} \in \mathbb{C}^{N \times N}$, and $\tilde{S} \in \mathbb{C}^{N \times P}$ is a diagonal matrix which consists of the singular values of C, $\tilde{S}$ denotes a diagonal matrix of singular values, H denotes the transpose, N denotes the length of the Fourier transform, and P denotes the number of virtual array elements in a processing direction (e.g., non-virtual or virtual effective array row or column). Note that $\tilde{S}$ comprises a diagonal matrix of singular values similar to eigenvalues for non-rectangular matrices. Finally, the pre and post coefficients for rank k in the LRA mechanism are computed using the $k^{th}$ singular value $$V_k = \tilde{S}_{k,k} \cdot \tilde{V}_{:,k} \quad (27)$$

$$U_k = \tilde{U}_{:,k} \quad (28)$$

The result of this operation is an approximated residual matrix given as follows (step 138)

$$C_K = [U_1 \ldots U_K]\begin{bmatrix} V_1^H \\ \vdots \\ V_K^H \end{bmatrix} \text{ where} \quad (29)$$

$$[U_1 \ldots U_K] \in \mathbb{C}^{N \times K}, \text{ and } \begin{bmatrix} V_1^H \\ \vdots \\ V_K^H \end{bmatrix} \in \mathbb{C}^{K \times P}(\text{step } 140).$$

Thus, $C_K \in \mathbb{C}^{N \times P}$ also has the same dimensions as B. $C_K$ has rank K, and according to the matrix approximation lemma or Eckart-Young-Mirsky theorem, it is the optimal rank K matrix which approximates the residuals matrix C with respect to the well-known Frobenius method and spectral norms.

In order to show that the coefficients of Equations (27) and (28) are the coefficients in the architecture and circuit of FIG. 6, the prior art DBF and LRA based DOA estimation operations are compared. On the one hand, the DBF approach computes the following DOA estimation $y_i$ for scan direction $\theta_i$ from the antenna array response x as follows $$y_i = \sum_{j=1}^{P} B_{i,j} \cdot x_j \qquad (30)$$

$$= \sum_{j=1}^{P} \frac{B_{i,j}}{F_{i,j}} \cdot F_{i,j} \cdot x_j$$

$$= \sum_{j=1}^{P} C_{i,j} \cdot F_{i,j} \cdot x_j$$

We then approximate C with $C_K$ to obtain $$C_{i,j} = \sum_{k=1}^{K} \{V_k\}_j \cdot \{U_k\}_i \qquad (31)$$

Inserting Equation (31) into Equation (30) yields the following $$y_i = \sum_{j=1}^{P} \sum_{k=1}^{K} \{V_k\}_j \cdot \{U_k\}_i \cdot F_{i,j} \cdot x_j \qquad (32)$$

$$= \sum_{k=1}^{K} \left( \sum_{j=1}^{P} F_{i,j} \cdot \{V_k\}_j \cdot x_j \right) \{U_k\}_i$$

Therefore, $y = \sum_{k=1}^{K} U_k \circ (F \cdot \text{diag}(V_k) x)$ \qquad (33)

where the 'o' operator represents the well-known Hadamard product or element wise multiplication. Note that Equation (33) is the exact same operation that is implemented in the circuit of FIG. 6. In particular, diag(V)·x is the multiplication of each element with a calibration pre-coefficient. F·diag(V)·x applies an FFT to the result. U∘(F·diag(V)·x) is an element wise multiplication of the post calibration values after the FFT. Summation over k of {U∘(F·diag(V)·x)} is the summation over the K ranks, e.g., four in the example disclosed herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of estimating direction of arrival (DOA) of a signal for use in a radar system, comprising:
   receiving an antenna array response vector as input data;
   element wise multiplying the input data by a number of sets of pre-coefficients to yield a first plurality of results;
   performing a plurality of fast Fourier transform (FFT) operations on said plurality of first results to generate a second plurality of results, wherein said FFT operations are performed in a spatial domain over a channel space of the antenna array response;
   element wise multiplying said second plurality of results by said number of sets of post-coefficients to yield a third plurality of results;
   summing said third plurality of results to yield an approximate DOA estimation; and
   wherein said number is a rank of said approximation.

2. The method according to claim 1, further comprising computing a different approximate DOA estimation for each desired azimuth and/or elevation direction angle to be scanned.

3. The method according to claim 1, wherein said pre-coefficients and said post-coefficients are calculated from a singular value decomposition of a distortion matrix.

4. The method according to claim 3, wherein said distortion matrix is determined by inverting an array response.

5. The method according to claim 4, wherein the array response is determined by performing a set of measurements over a plurality of angles with a single target in a controlled environment.

6. A method of estimating direction of arrival (DOA) of a signal for use in a radar system, comprising:
receiving an antenna array response vector as input data x;
multiplying each element of the input data x by k sets of pre-coefficients $V_k$ to yield k first results $\text{diag}(V_k) \cdot x$;
performing k fast Fourier transform operations F on said k first results to generate k second results $F \cdot \text{diag}(V_k) \cdot x$;
element wise multiplying said k second results by k sets of post-coefficients $U_k$ to yield k third results $U_k \circ (F \cdot \text{diag}(V_k) \cdot x)$;
summing said k third results to yield an approximate DOA estimation y; and
wherein said value k is a rank of said approximation.

7. The method according to claim 6, further comprising computing a different approximate DOA estimation y for each desired azimuth and/or elevation direction angle to be scanned.

8. The method according to claim 6, wherein said approximation rank k is different for azimuth and elevation DOA estimation.

9. The method according to claim 6, wherein said pre-coefficients $V_k$ and post-coefficients $U_k$ are calculated from a singular value decomposition of a distortion matrix $C = \tilde{U} \cdot \tilde{S} \cdot \tilde{V}^H$, wherein $V_k = \tilde{S}_{k,k} \tilde{V}_{:,k}$, $U_k = \tilde{U}_{:,k}$, $\tilde{V} \in C^{P \times P}$, $\tilde{U} \in C^{N \times N}$, $\tilde{S} \in C^{N \times P}$ is a diagonal matrix of singular values of C, H denotes the transpose, N denotes the length of the fast Fourier transform, and P denotes the number of virtual array elements in a processing direction.

10. The method according to claim 9, wherein said distortion matrix is determined by inverting an array response.

11. The method according to claim 10, wherein the array response is determined by performing a set of measurements over a plurality of angles with a single target in a controlled environment.

12. An apparatus for estimating direction of arrival (DOA) of a signal for use in a radar system, comprising:
a radar signal processing circuit operative to receive a receive antenna array response x;
said radar signal processing circuit operative to:
multiply each element of said antenna array response by k sets of pre-coefficients $V_k$ to yield k first results $\text{diag}(V_k) \cdot x$;
perform k fast Fourier transform operations F on said k first results to generate k second results $F \cdot \text{diag}(V_k) \cdot x$;
element wise multiply said k second results by k sets of post-coefficients $U_k$ to yield k third results $U_k \circ (F \cdot \text{diag}(V_k) \cdot x)$;
sum said k third results to yield an approximate DOA estimation y; and
wherein said value k is a rank of said approximation.

13. The apparatus according to claim 12, wherein said radar signal processing circuit is operative to compute a different approximate DOA estimation y for each desired azimuth and/or elevation direction angle to be scanned.

14. The apparatus according to claim 12, wherein said approximation rank k is different for azimuth and elevation DOA estimation.

15. The apparatus according to claim 12, wherein said pre-coefficients $V_k$ and post-coefficients $U_k$ are calculated from a singular value decomposition of a distortion matrix $C = \tilde{U} \cdot \tilde{S} \cdot \tilde{V}^H$, wherein $V_k = \tilde{S}_{k,k} \tilde{V}_{:,k}$, $U_k = \tilde{U}_{:,k}$, $\tilde{V} \in C^{P \times P}$, $\tilde{U} \in C^{N \times N}$, $\tilde{S} \in C^{N \times P}$ is a diagonal matrix of singular values of C, H denotes the transpose, N denotes the length of the fast Fourier transform, and P denotes the number of virtual array elements in a processing direction.

16. The apparatus according to claim 15, wherein said distortion matrix is determined by inverting an array response.

17. The apparatus according to claim 16, wherein the array response is determined by performing a set of measurements over a plurality of angles with a single target in a controlled environment.

18. An automotive radar sensor, comprising:
a printed circuit board (PCB) assembly including:
a plurality of transmitting antennas fabricated on one side of said PCB assembly;
a plurality of receiving antennas fabricated on an opposite side of said PCB assembly; and
a transceiver coupled to said plurality of transmitting antennas and said plurality of receiving antennas, said transceiver operative to generate and supply transmitting signals to said plurality of transmitting antennas and receive signals of a wave reflected back to said plurality of receiving antennas;
a radar signal processing circuit coupled to said transceiver and operative to:
receive an antenna array response vector as input data x;
multiply each element of said input data x by k sets of pre-coefficients $V_k$ to yield k first results $\text{diag}(V_k) \cdot x$;
perform k fast Fourier transform operations F on said k first results to generate k second results $F \cdot \text{diag}(V_k) \cdot x$;
element wise multiply said k second results by k sets of post-coefficients $U_k$ to yield k third results $U_k \circ (F \cdot \text{diag}(V_k) \cdot x)$;
sum said k third results to yield an approximate DOA estimation y; and
wherein said value k is a rank of said approximation.

19. The sensor according to claim 18, wherein said pre-coefficients $V_k$ and post-coefficients $U_k$ are calculated from a singular value decomposition of a distortion matrix $C = \tilde{U} \cdot \tilde{S} \cdot \tilde{V}^H$, wherein $V_k = \tilde{S}_{k,k} \tilde{V}_{:,k}$, $U_k = \tilde{U}_{:,k}$, $\tilde{V} \in C^{P \times P}$, $\tilde{U} \in C^{N \times N}$, $\tilde{S} \in C^{N \times P}$ is a diagonal matrix of singular values of C, H denotes the transpose, N denotes the length of the fast Fourier transform, and P denotes the number of virtual array elements in a processing direction.

* * * * *